E. W. GOODRICK.
APPARATUS FOR MANUFACTURING PACKING PADS.
APPLICATION FILED MAR. 13, 1909.

1,018,181.

Patented Feb. 20, 1912.

9 SHEETS—SHEET 1.

Witnesses

Inventor
Edward William Goodrick
By Erwin & Wheeler
Attorneys

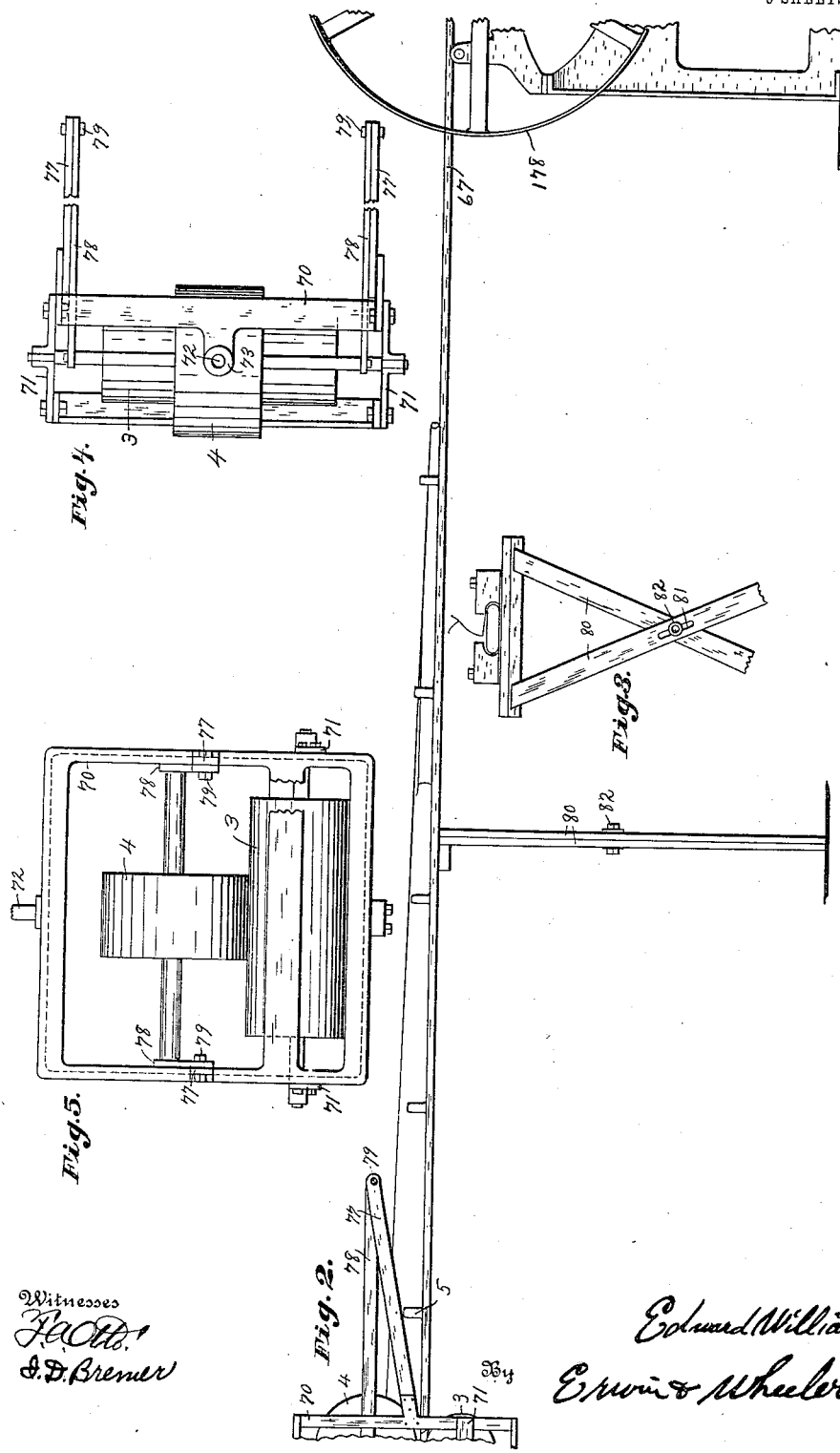

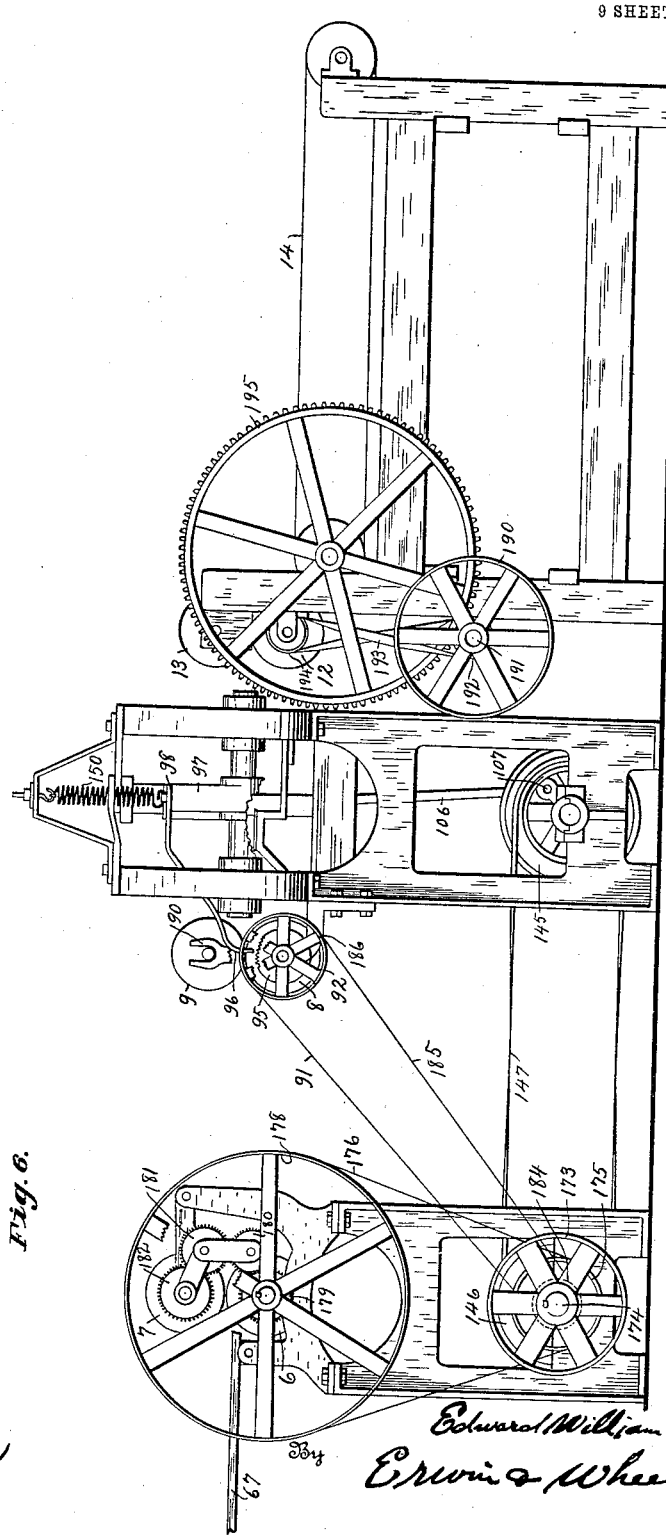

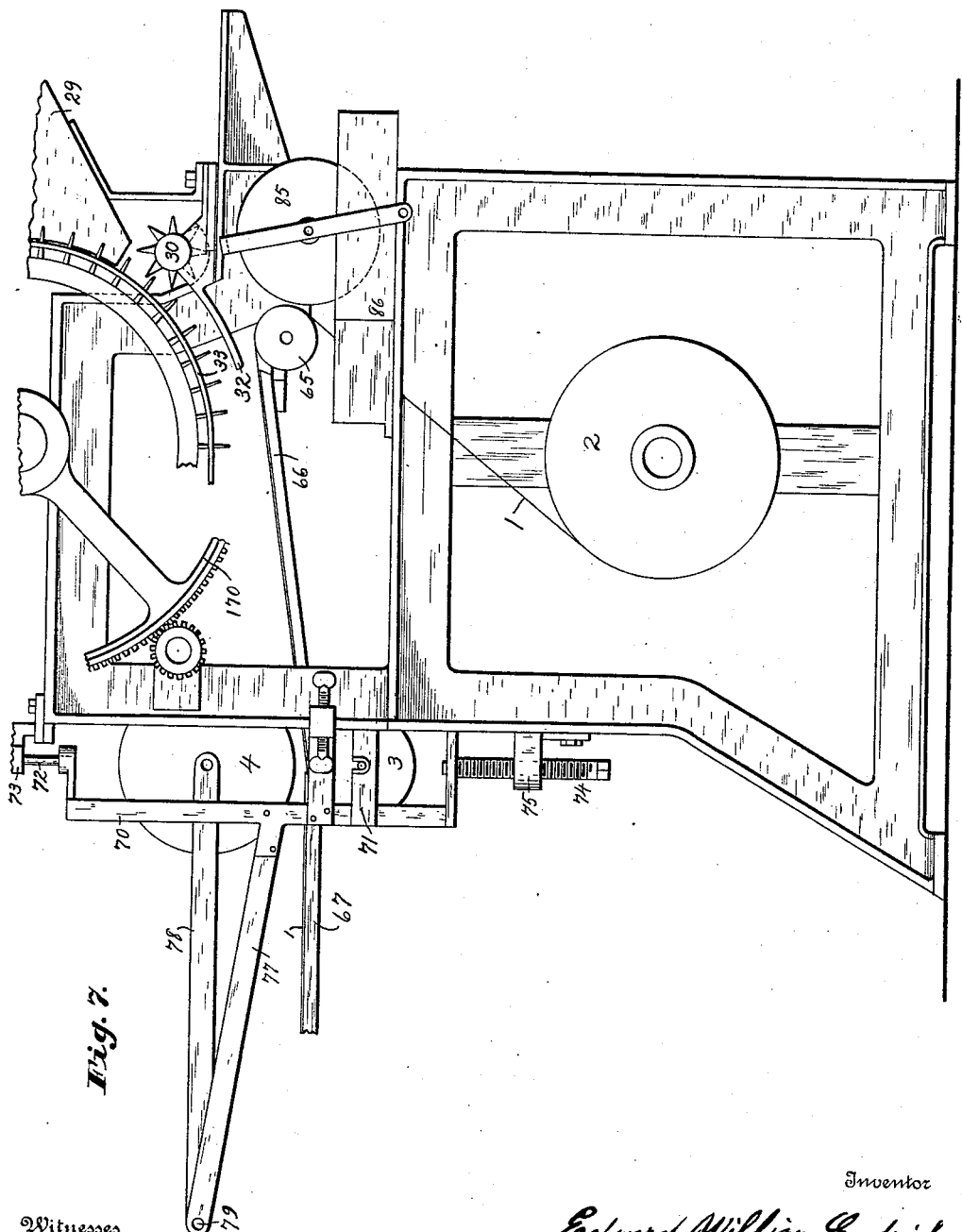

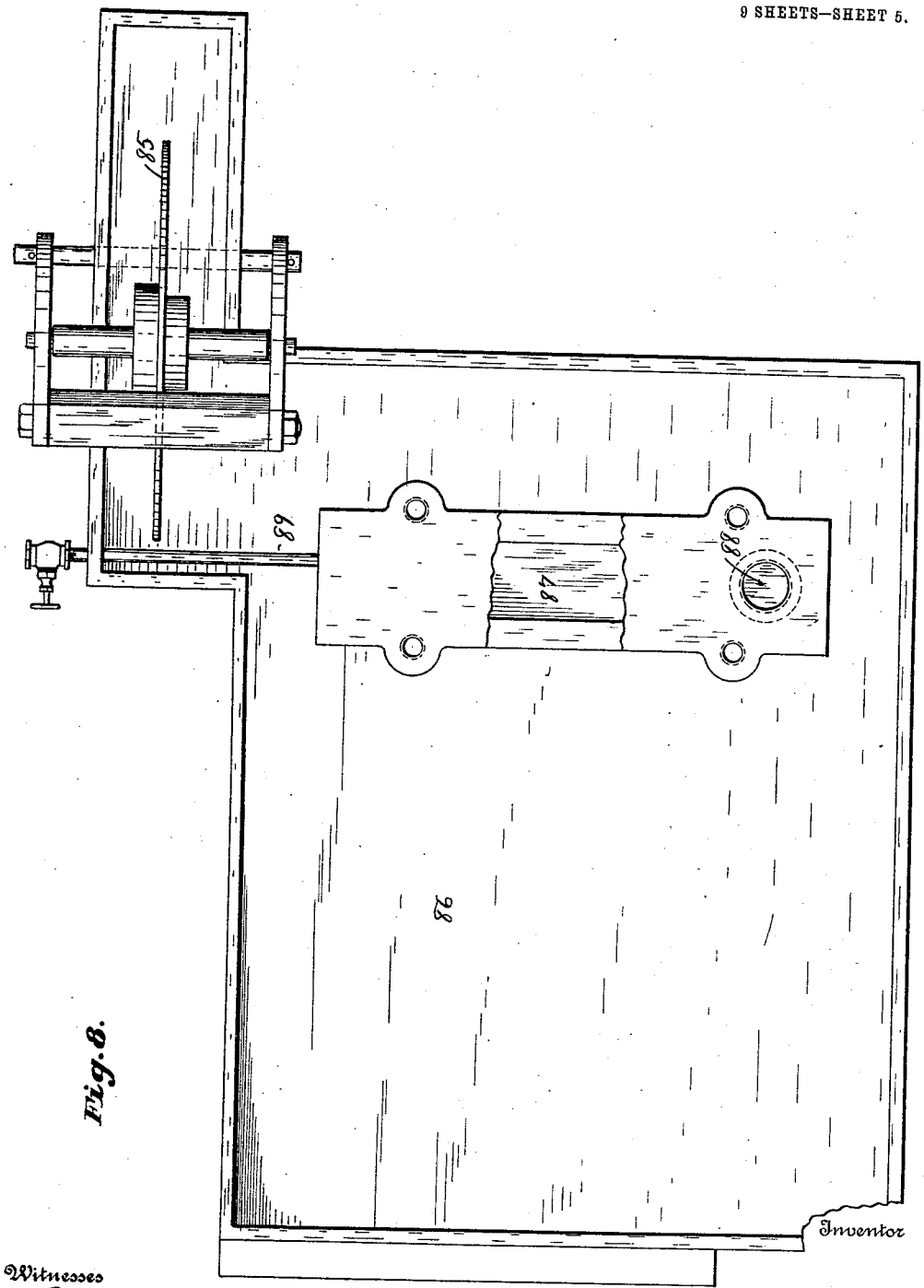

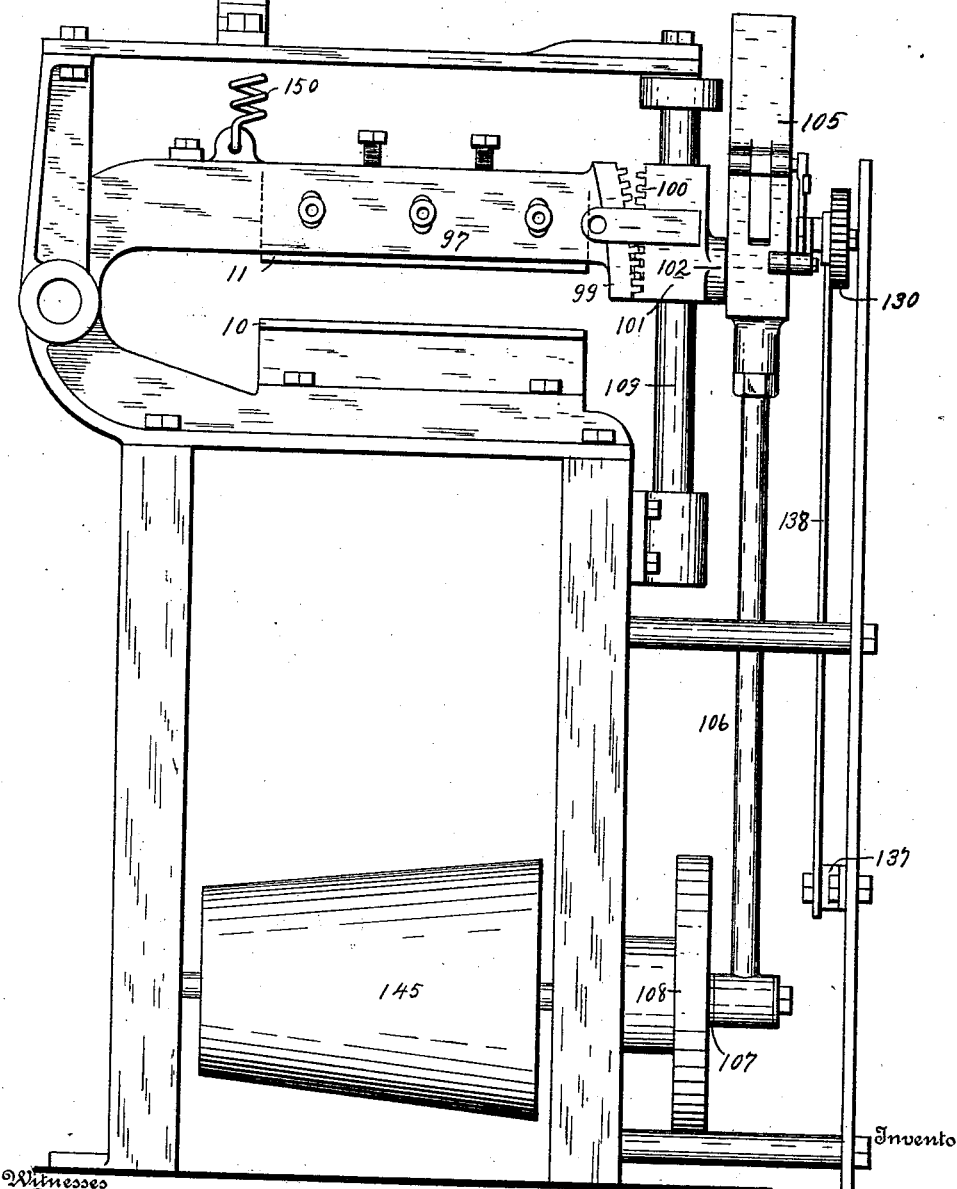

E. W. GOODRICK.
APPARATUS FOR MANUFACTURING PACKING PADS.
APPLICATION FILED MAR. 13, 1909.

1,018,181.

Patented Feb. 20, 1912.

9 SHEETS—SHEET 7.

E. W. GOODRICK.
APPARATUS FOR MANUFACTURING PACKING PADS.
APPLICATION FILED MAR. 13, 1909.
1,018,181.
Patented Feb. 20, 1912.
9 SHEETS—SHEET 8.
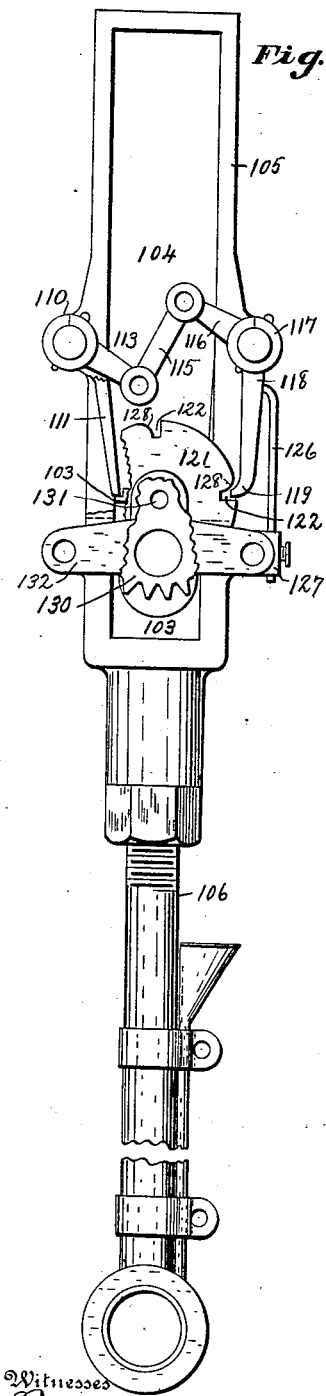
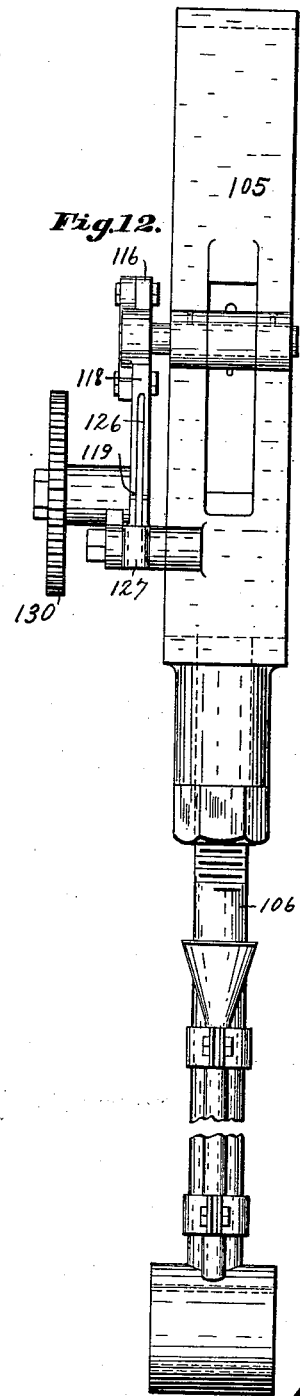
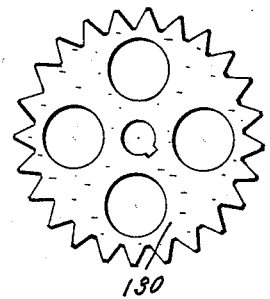
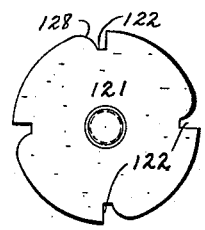

E. W. GOODRICK.
APPARATUS FOR MANUFACTURING PACKING PADS.
APPLICATION FILED MAR. 13, 1909.
1,018,181.
Patented Feb. 20, 1912.
9 SHEETS—SHEET 9.
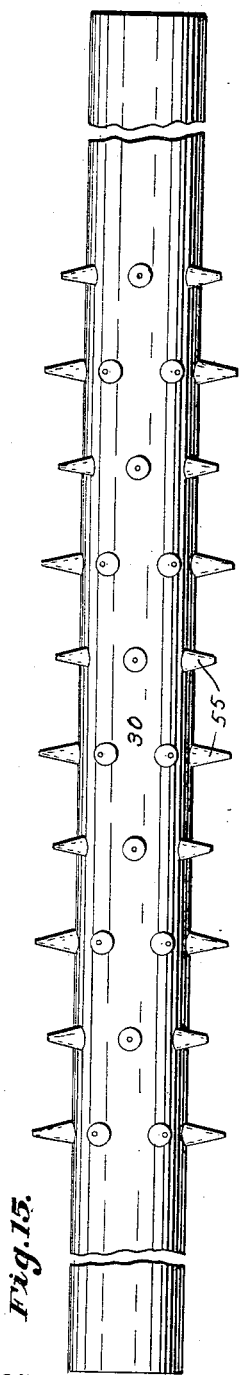
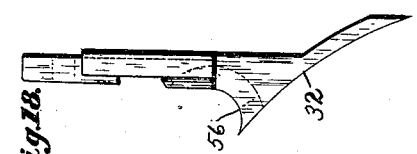
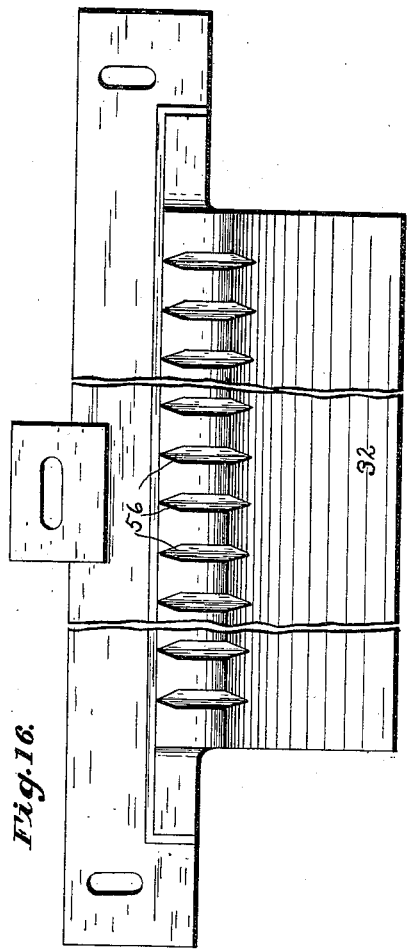
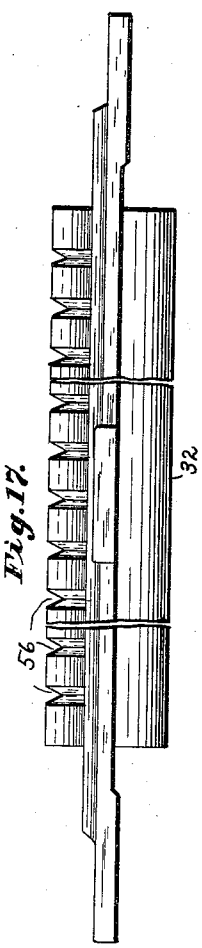

UNITED STATES PATENT OFFICE.

EDWARD WILLIAM GOODRICK, OF OSHKOSH, WISCONSIN, ASSIGNOR TO OSHKOSH EXCELSIOR MFG. CO., OF OSHKOSH, WISCONSIN, A CORPORATION OF WISCONSIN.

APPARATUS FOR MANUFACTURING PACKING-PADS.

1,018,181.      Specification of Letters Patent.      Patented Feb. 20, 1912.

Application filed March 13, 1909. Serial No. 483,172.

*To all whom it may concern:*

Be it known that I, EDWARD WILLIAM GOODRICK, a citizen of the United States, residing at Oshkosh, county of Winnebago, and State of Wisconsin, have invented new and useful Improvements in Apparatus for Manufacturing Packing-Pads, of which the following is a specification.

My invention relates to improvements in apparatus for manufacturing packing pads.

The objects of my invention are to provide improved means for combing and depositing the material in a substantially uniform layer upon a continuous strip of wrapping paper which is folded about the filling material and the margins glued together, and compressed to produce a flat pad, which is then cut into the desired lengths; also to provide improved means for cutting the pad into lengths without interfering with or stopping the operation of the pad forming mechanism; also to provide improved means for adjusting the apparatus for forming pads of different widths and lengths and to provide other structural improvements as hereinafter described and claimed.

In the following description, reference is had to the accompanying drawings, in which,—

Figure 1:
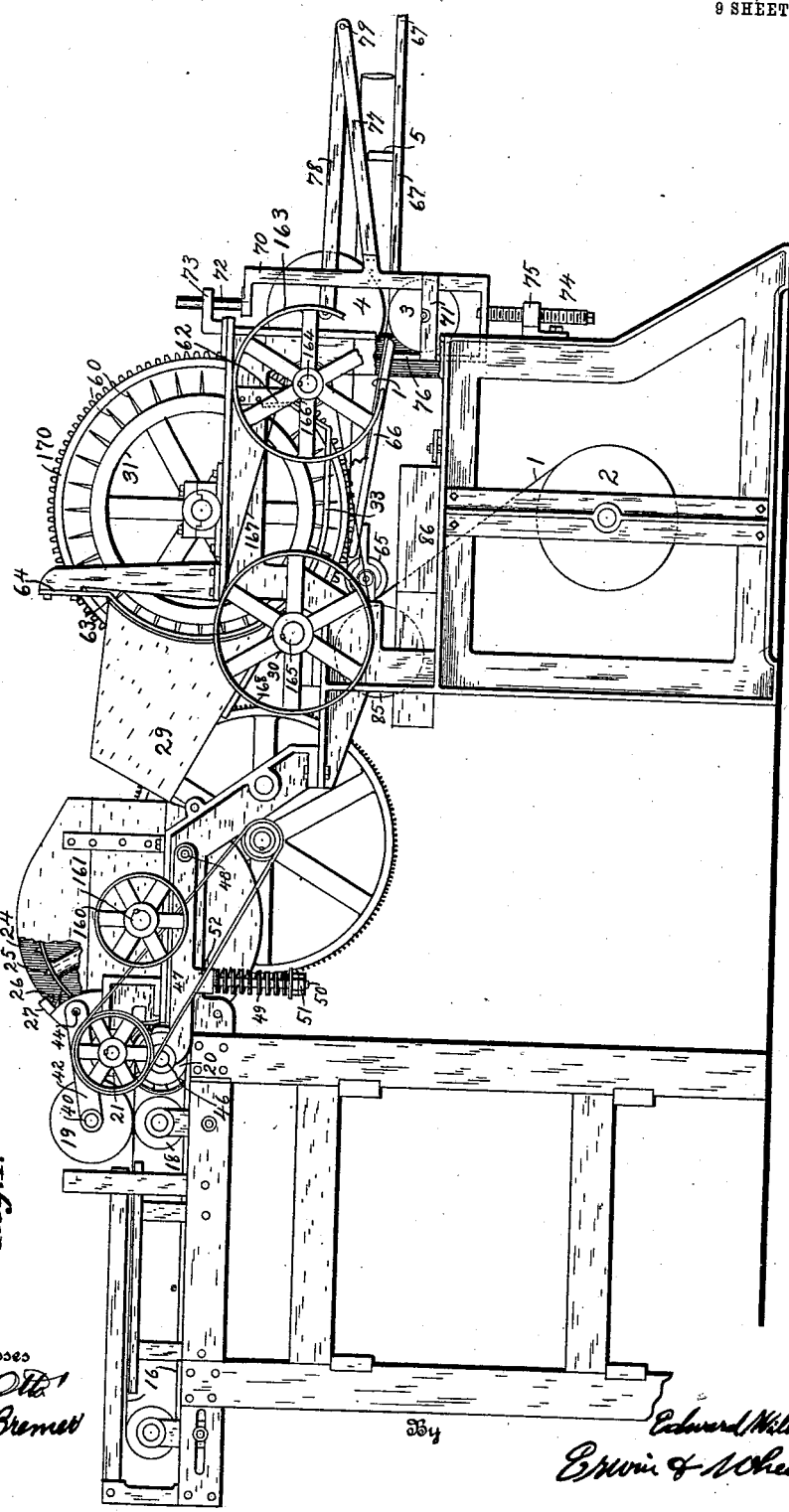
Figure 10:
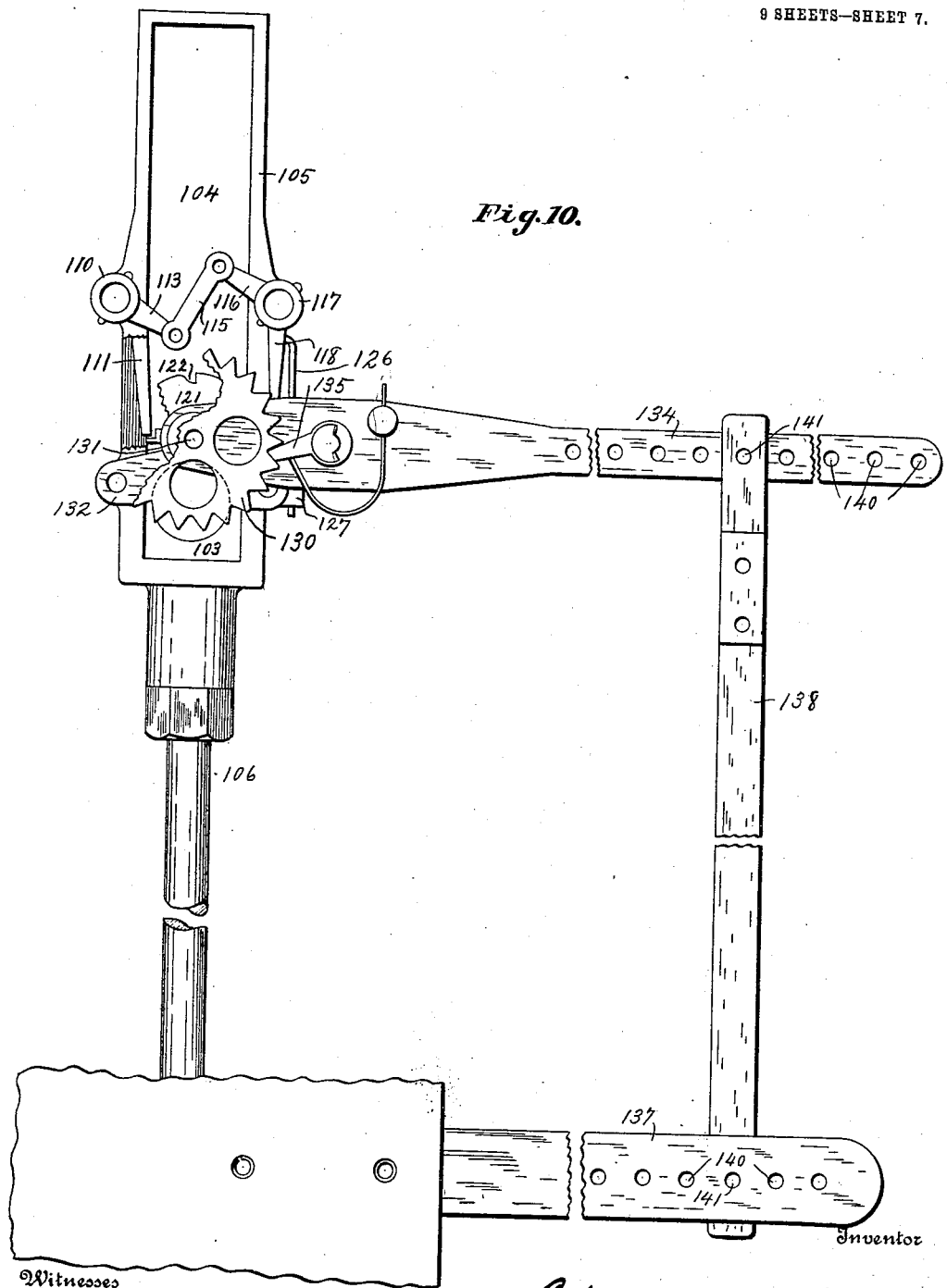

Figure 1 is a side view of the initial portion of my improved apparatus. Fig. 2 is a side view of the central portion of the same. Fig. 3 is a cross sectional view drawn on line *x—x* of Fig. 2. Fig. 4 is a detail plan view of the forming rolls. Fig. 5 is a rear view of the same. Fig. 6 is a side view of the rear end portion. Fig. 7 is a side view of said rolls showing also the feeding and gluing mechanism, showing the opposite side from that seen in Fig. 1. Fig. 8 is a plan view of the glue pan and distributing wheel. Fig. 9 is a detail rear view of a portion of the mechanism for changing the knife stroke intervals. Fig. 10 is a detail view of the interval changing means, detached and viewed from the side opposite that shown in Fig. 1, with parts broken away to show the step by step mechanism. Fig. 11 is a similar view of the step by step mechanism, broken away on different lines than those of Fig. 9. Fig. 12 is a detail front view of the same. Figs. 13 and 14 are detail views respectively of the step by step ratchet and cam wheels respectively, which are shown broken away in Figs 10 and 11. Fig. 15 is a detail view of the feed regulating roller. Figs. 16 and 17 are detail views of the grooved concave plate with which the pins of the feed regulating roller interact. Fig. 18 is a detail side view of said plate.

Like parts are identified by the same reference characters throughout the several views.

In the apparatus illustrated, the paper covering strip 1 is fed from a roll 2 between the forming rollers 3 and 4 and then between forming guides 5, pressing rollers 6 and 7, and detaining rollers 8 and 9 to the stationary and movable knives 10 and 11, respectively, where the strip is cut into lengths and the latter passed between the rollers 12 and 13 to a conveyer apron 14 which transfers them to any suitable delivery point. The filling for the pads will ordinarily consist of excelsior. This filling is fed by any suitable means upon a conveyer apron 16, by which it is carried between sets of compression rollers 18 and 19, 20 and 21, and received by a combing cylinder 24 which is provided with projecting teeth 25 adapted to engage and lift the material, and convey it upwardly past the stationary combing fingers 26 of a concave member 27, the material being then carried over the cylinder and dropped into an inclined chute 29, which delivers it between a feed regulating toothed roller 30 and a distributing cylinder 31 which revolves in an opposite direction from cylinder 24 and draws the material downwardly over a concave member 32 where it passes underneath the stationary clearing bars 33 and is delivered to the covering strip 1.

It will be observed that the combing cylinder is provided with relatively short radially projecting teeth, the teeth of the concave being considerably longer. The short teeth of the combing cylinder are therefore incapable of carrying the material over this cylinder in bunches, but on the contrary these teeth strip the material progressively from the concave teeth and tend to arrange the pieces or shreds of excelsior by drawing or combing them out longitudinally from between the combing teeth, thus securing a much more uniform feed to the distributing cylinder than can otherwise be obtained. The distributing cylinder is provided with longer teeth, thus insuring a positive feed of the material delivered to it from the combing cylinder. I believe that I am the first to use this combination of a combing and distributing cylinder.

The conveyer apron 16 may be of any ordinary construction. The feed roller 18 is mounted in stationary bearings, but the roller 19 is mounted in bearings 40 carried by the swinging arms 42, which are pivoted to the frame at 44 and allow the weight of the roller 19 to be exerted upon the material for a preliminary compression, with a comparatively light yielding pressure, so that there will be no tendency to hold back the material on the conveyer, or cause its accumulation in bunches. The rollers 20 and 21 receive the material for a further and heavier compression as it comes from the rollers 18, and 19, the latter holding the material to the conveyer and delivering it positively to the rollers 20 and 21. The roller 21 is mounted in fixed frame bearings 45 and the roller 20 in bearings 46 in the ends of the levers 47 which are pivoted to the frame at 48, the levers being supported intermediately upon springs 49, coiled about hangers 50, depending from the frame, and provided with spring adjusting nuts 51. The levers have offset yoke arms 52 which rest upon the upper ends of the springs 49, and by adjusting the nuts 51, the roller 20 may be pushed in the direction of roller 21 with any desired degree of yielding pressure.

The combing teeth 25 on cylinder 24 preferably extend radially, while teeth 26 preferably have an angular pitch in the direction in which the material moves. The material is thus drawn or combed out longitudinally in passing the teeth 26 and then carried trailingly over the cylinder by the teeth 25 and thrown loosely and in part by centrifugal force, into the chute 29. This has been found to prepare and deliver the material in the best possible condition for a uniform feeding action of the distributing cylinder.

At the lower end of chute 29, the material is received by the feed regulating toothed roller 30, which revolves slowly in the direction in which the material moves, and is provided with detaining teeth 55 adapted, on the under side of the roller, to enter channels 56 in the concave member 32, thus preventing these teeth from carrying the material around, or winding it upon the roller. The teeth 55 are tapered, and the concave member and its channels are so formed that any material clinging to the teeth will be pushed off as the teeth enter the channels 56. The cylinder 31 is provided with radial teeth 60 which comb the material as it passes the feed regulating roller 30 and deliver it over the concave member 32. The stationary clearing bars 33 are secured to the frame at 62 and extend tangentially between the teeth 60 and around the cylinder 31 to a point 63, and then upwardly to a frame bar 64 to which they are also secured. These bars prevent the material from moving inwardly and matting against the surface of the cylinder, and the tangential portion pushes the material from the teeth and causes it to drop upon the moving strip of paper 1.

The strip of covering paper 1 passes from the roller 2 over a guide roller 65 and then along the upper surface of a platform 66, which extends angularly downwardly to the upper surface of roller 3. After passing the roller 3, the strip of paper passes above platform 67, which extends at a different angle, or horizontally, to the roller 6. The roller 4, (which is narrower than the width of the strip), will therefore depress the central portion of the strip and cause the sides to fold vertically, and this folding process is continued by the guides 5, which successively fold the margins to an additional extent until they are caused to overlap in a substantially horizontal position.

The rollers 6 and 7 are positively driven from the source of power as hereinafter explained, and these rollers constitute the feeding rollers for the strip of paper, since they draw it from the rollers 2. The strip therefore tends to draw in a straight line across the angular dip in the platform, while the pressure of the roller 4 tends to force the strip downwardly in the direction of said angular dip, and thus causes the sides of the strip to turn upwardly in a position to be readily engaged and progressively folded by the guides 5.

The initial folding of the paper by means of the rollers 3 and 4 requires a correct adjustment of the platforms, and a readjustment when a change is to be made in the width of the pads. To accomplish this, I connect the adjacent ends of the platforms 66 and 67 with a vertically movable frame 70 having cross bars 71 in which the roller 3 is journaled. The upper end of this frame is supported from the main frame of the machine by a post 72, sliding vertically in an eye bracket 73. The lower end of the frame is mounted upon vertically movable screws 74 having threaded bearings in the fixed main frame bearings 75, whereby the frame may be raised or lowered as desired. The upwardly extending posts 76 of the frame support the platform 66 near the roller 3. Arms 77, connected with the frame 70 on each side, form supports for the roller supporting arms 78, in the front end portions of which the roller 4 is journaled, and these arms, at their rear ends, are pivoted to the arms 77 at 79, the arms 78 being left free to swing and thus permit a vertical movement of the roller 4, both for the purpose of readjustment and to permit the roller to rise and fall in accordance with the thickness of the material, which cannot be absolutely uniform. The platform 67 may also be adjusted in height at an intermediate point, the same being supported by the crossed braces 80, slotted at 81 and secured together by a bolt 82.

One margin of the strip of paper 1 is glued in passing over the roller 65 by a gluing wheel 85, which revolves in the glue pan 86 and also bears upon the margin of the paper strip as best shown in Fig. 1. The glue pan is provided with a chamber 87 having inlet and outlet pipes 88 and 89 respectively, to provide a circulation of heating fluid adapted to melt the glue when the machine is in operation. The portion of the glue pan occupied by the wheel 85 is offset from the body of the pan to provide clearance for the paper strip.

After the strip of paper has been glued, and the filling material deposited thereon, it is folded as above described, the glued side being folded more rapidly by the guides 5 than the other side, whereby the glued outer margin will be received under the other margin when the folding operation is completed. The strip then passes between the rollers 6 and 7 and is compressed to form a continuous pad and cause the overlapping margins to adhere. The roller 6 revolves in fixed bearings, but the roller 7 is supported from the frame by arms 7, which permit it to yield and apply a uniform pressure to the strip regardless of any inequalities in thickness.

The rollers 3 and 4, 6 and 7 have the same peripheral speed. The rollers 8 and 9 have a somewhat greater speed, but the upper roller 9 runs idle in open slot bearings 90 and the lower roller 8 is driven by a belt 91 and pulley 92, the belt being sufficiently loose to permit it to slip when the roller 8 is locked against rotation, or when it would otherwise be compelled by reason of the slower motion of the strip, to slide thereon. The shaft of the roller 8 is provided with a toothed or notched wheel 95 which is engaged by a resilient locking arm, or pawl 96, when the movable knife 11 descends to sever the pad, the pawl arm 96 being secured to the supporting arm 97 of the knife 11 at 98.

The knife 11 is rigidly secured to the arm 97 and the latter is pivotally secured at one end to the machine frame, and at the other end is provided with a gear segment 99 which meshes with a vertical rack 100 carried by a vertically sliding member 101 on frame rod 109, whereby the vertical movement of rack 100 is transmitted to actuate the knife. The member 101 has a stud journal 102, engaged in a bearing block 103. This is loosely mounted in a guide way 104 in a yoke 105, which forms the upper end of a connecting rod 106, actuated by a crank 107 from a crank wheel 108. When this block 103 is locked to the yoke 105, the motion of the connecting rod is transmitted to the member 101. When unlocked, the yoke 105 slides freely on the bearing block and transmits no motion thereto.

To actuate the knife at the proper intervals, the yoke 105 is provided with a bell crank at 110, having a locking arm 111, and adapted to engage the upper surface of the bearing block 103, when the latter is at the bottom of the guide way. The other arm 113 of this bell crank is connected by link 115 with an arm 116 of an actuating bell crank, pivoted to the yoke 105 at 117, and having a depending arm 118 provided with a curved extremity 119 which bears upon the periphery of a disk 121 and is adapted to enter notches 122 therein. The disk 121 normally supports arm 118 in a position to hold arm 11 in unlocking position, but when the extremity 119 registers with notch 125 in disk 121, it is pushed into such notch by a spring 126 connected with a yoke projection 127. One side of each notch 125 is rounded at 128, so that a partial rotation of the disk will again push extremity 119 out of the notch 122.

The disk is so actuated, or partially rotated, by a step by step ratchet member 130, both the disk and this ratchet member being fast on a shaft 131, journaled in the bracket cross arm 132. To actuate this ratchet, an arm 134 is pivoted to shaft 131 and provided with a spring actuated pawl 135 engaging the ratchet teeth, and the outer end of the arm is supported from the frame by a horizontal bar 137 and an upright link bar 138, pivotally and adjustably connected to bar 137 and arm 134 at its respective ends. With this construction, each reciprocating movement of the yoke 105, causes the pawl 135 to move over one or more teeth of the ratchet wheel and actuate the latter step by step during the return strokes. The length of the step by step movement is controlled by adjusting the link bar 138,—this bar, the arm 134 and bar 137 being provided with holes 140 for the reception of the pivot pins 141. It is obvious that as the block 103 will only be locked to the yoke 105 when the arm 118 is in engagement in a notch 125, and as the knife will only be actuated when block 103 is so locked, the interval between successive knife strokes will be lengthened or shortened in proportion to the length of the step by step movements, this being in turn determined by the number of ratchet teeth over which the pawl 135 passes during each stroke of the connecting rod. By adjusting link bar 138 toward the ratchet, this movement of the pawl will be lengthened, while an adjustment in the opposite direction will shorten the pawl movement and reduce the number of ratchet teeth skipped on a given stroke.

The interval between knife strokes may be further regulated for a narrower range of variations by actuating the crank wheel 108 through the cone pulleys 145 and 146 and belt 147, whereby the motion of the crank wheel may be increased or diminished in speed by adjusting the belt on the pulleys. The knife is normally held in raised position by a spring 150, the member 101 and bearing block 103 being therefore also raised, and this block 103 will therefore be at the bottom of the guide way 104 only when the connecting rod is at its highest point, and if the block is then locked in the yoke as above described, the downward movement of the connecting rod will carry the block with it and impart a downward movement to the knife. The locking pawl 96 is carried by the knife into contact with wheel 95 preparatory to separating the strip, and the rollers 8 and 9 thereupon hold this portion of the strip against further forward movement, pending the return movement of the knife. The strip continues to feed past the rollers 6 and 7 however, sufficient space being provided between these rollers and the rollers 8 and 9 to permit the strip to sag or buckle. As soon as the knife has been again raised out of the path of the strip, the pawl arm 96 is thereby removed from locking position and the rollers 8 and 9 thereupon advance the strip across the path of the knife, and owing to their more rapid motion, the sagging or buckling portion of the strip will be straightened out. The motion of all other portions of the strip may therefore be continuous.

My improved apparatus will ordinarily be driven from a line shaft or countershaft, (not shown) by applying the power separately to pulley 160 on the combing cylinder shaft 161, the motion of this shaft being transmitted by ordinary gears and shafting (not fully shown) to the roller 21, and the roller 20 over which the apron 16 passes. The rollers 18 and 19 are actuated by the apron 16. Power is separately applied to the next section of the machine containing the distributing cylinder, through the pulley 163 and from its shaft 164 to shaft 165 of detaining roller 30 through pulley 166, belt 167 and pulley 168, also from shaft 164 and a pinion thereon, (not shown) to cylinder 31 through gear wheel 170.

Motion is also separately transmitted to the third section of the machine containing the pressing rollers and separating mechanism, through pulley 173 and shaft 174; from shaft 174 to roller 6 through pulley 175, belt 176 and pulley 178; to roller 7 from roller 6 through gears 179, 180, 181, and 182; from shaft 174 to roller 8 through pulleys 184, belt 185 and pulley 186. The cone pulley 146 is mounted upon shaft 174.

Motion is also transmitted from the source of power to the roller 12 through pulley 190, shaft 191, pulley 192, belt 193 and pulley 194; and to the receiving conveyer through gear wheel 195 which meshes with a pinion (not shown) on the other end of shaft 191. The form or arrangement of these driving connections is, however, not material, and they are therefore not shown or described in detail.

Having thus described my invention what I claim as new and desire to secure by Letters Patent is,—

1. In apparatus of the described class, the combination with means for feeding a continuous covering strip and distributing filling material thereto, of a feeding conveyer for the material, a toothed combing cylinder having relatively short teeth, a concave provided with longer combing teeth in operative relation to the cylinder and means for delivering the material from the combing cylinder to the distributing means.

2. In apparatus of the described class, the combination with means for feeding a continuous covering strip and distributing filling material thereto, of a feeding conveyer for the material, a toothed combing cylinder having relatively short teeth, a concave provided with longer combing teeth in operative relation to the cylinder and means for delivering the material from the combing cylinder to the distributing means, said combing cylinder being arranged to engage the material on its upwardly moving side and carry it over the cylinder to the delivery point beyond said concave.

3. In apparatus of the described class, the combination with means for feeding a continuous covering strip and distributing filling material thereto, of a feeding conveyer for the material, a toothed combing cylinder, a concave provided with combing teeth in operative relation to the cylinder and means for delivering the material from the combing cylinder to the distributing means, said combing cylinder being arranged to engage the material on its upwardly moving side and carry it over the cylinder to the delivery point beyond said concave, together with a series of compression rollers arranged to bear with successively increasing pressure upon the material carried by the conveyer, preparatory to its delivery to the combing cylinder, one roller of each set being supported by pivotally swinging levers, and the levers of the last set of such rollers being provided with adjustable spring tension connections.

4. In apparatus of the described class, the combination with pad filling and forming devices of a combing cylinder having outwardly projecting and relatively short radial teeth, and a concave having longer teeth arranged to interact with those on the combing cylinder, said cylinder being arranged to rotate upwardly along the surface of the concave.

5. In apparatus of the described class, the combination with pad filling and forming devices of a combing cylinder, having outwardly projecting and relatively short radial teeth, and a concave having longer teeth arranged to interact with those on the combing cylinder, said cylinder being arranged to rotate upwardly along the surface of the concave, the teeth of said concave being arranged to extend trailingly in the direction of cylinder movement.

6. In apparatus of the described class, the combination with pad filling and forming devices of a combing cylinder, having outwardly projecting teeth, and a concave having teeth arranged to interact with those on the combing cylinder, the latter being arranged to rotate upwardly along the surface of the concave, and the teeth of said concave being arranged to extend trailingly in the direction of cylinder movement, together with a toothed distributing cylinder, revolving in the opposite direction from that of the combing cylinder, a detaining roller having teeth interacting with those of the distributing cylinder, and a concave member having channels in which the detainer teeth are adapted to fit.

7. In apparatus of the described class, the combination of a platform formed in sections, having a relative angular pitch from an intermediate point, means for extending a paper strip longitudinally across the angle in said platform, a forming roller arranged to bear yieldingly against the central portion of the strip on the upper side, forming guides for the side portions of the strip, a roller supporting the under surface of the strip underneath the forming roller, and a vertically adjustable frame supporting said rollers.

8. In apparatus of the described class, the combination of a main frame, a set of guide rollers for a continuous paper strip, and a set of forming rolls interposed between the guide rollers, a vertically adjustable frame supporting the forming rolls in a depressed position with reference to the guide rollers, said frame having arms extending longitudinally of the strip, and roll supporting arms pivotally connected therewith and provided with journals supporting the upper forming roll.

9. In apparatus of the described class, the combination of a main frame, a set of guide rollers for a continuous paper strip and a set of forming rolls interposed between the guide rollers, a vertically adjustable frame supporting the forming rolls in a depressed position with reference to the guide rollers, said frame having arms extending longitudinally of the strip, and roll supporting arms pivotally connected therewith and provided with journals supporting the upper forming roll, said adjustable frame having its upper end provided with a vertically extending pivot post loosely engaged by the main frame, and its lower end mounted upon vertically adjustable screws mounted in the main frame.

10. In apparatus of the described class, the combination of a combing cylinder having short blunt teeth, a concave having relatively long teeth extending between the paths of the cylinder teeth, means for feeding pad filling material to said combing cylinder, a toothed distributing cylinder arranged to receive material from the combing cylinder, and a set of clearing bars extending between the teeth of the distributing cylinder, and each having its respective ends projected beyond the circles described by the outer ends of such teeth, whereby the material is prevented from passing the bars and its delivery from the teeth insured, means for feeding a flexible covering into a position to receive the material from said distributing teeth, and means for folding said covering to form a pad.

11. In apparatus of the described class, the combination with means for feeding pad filling and pad covering materials, of coöperative sets of relatively movable and interacting combing teeth, located in position to receive the filling material, a set of clearing bars and a set of distributing teeth movable into and out of the spaces between the clearing bars to rake the combed material thereunder and deliver it to the pad covering material.

12. In apparatus of the described class, the combination with means for feeding pad filling and covering materials, of a toothed combing cylinder to which the filling material is fed, a toothed concave in operative relation to said cylinder on its upwardly moving side, a toothed distributing cylinder receiving the material from the combing cylinder, and arranged to deliver it to the covering material, and relatively stationary detaining teeth, regulating the delivery of the material from the combing to the distributing cylinder.

13. In apparatus of the described class, the combination with devices for feeding pad filling and covering materials, of combing mechanism for separating the filling material, a distributing cylinder receiving the material from the combing mechanism and arranged to deliver it to the covering material, a feed regulating roller provided with tapered detaining teeth governing the delivery of the combed material to the distributing cylinder, and a concave member on the opposite side of said roller from said cylinder, provided with channels in which the detaining teeth fit when the feed regulating roller is rotated.

14. In apparatus of the described class, the combination with devices for feeding pad filling and covering materials, of combing mechanism for separating the filling material, a distributing cylinder receiving the material from the combing mechanism and arranged to deliver it to the covering material, a feed regulating roller provided with tapered detaining teeth governing the delivery of the combed material to the distributing cylinder, and a concave member on the opposite side of said roller from said cylinder, provided with channels in which the detaining teeth fit when the feed regulating roller is rotated, together with a set of stationary clearing bars extending between the distributing teeth and outwardly therefrom on the rear side of said cylinder above the covering material to insure the delivery of the filling material thereto.

15. In apparatus of the described class, the combination with devices for simultaneously and continuously feeding pad forming material and a continuous strip of covering material, combing mechanism for the filling material, and distributing mechanism for delivering the filling material to the covering material, means for gumming and folding the covering material over the filling material, and means for severing the folded, gummed, and filled strip, of a set of compression rollers for flattening the filled strip, another set of rollers for feeding the filled strip to the severing mechanism, connections for stopping the feeding rollers during the operation of the severing mechanism, and means for driving said feed rollers at a greater rate of speed than the severing rollers, one of the feed rollers being yieldingly mounted in its bearings and having a sufficiently light pressure upon the strip to permit the rollers to slip upon the strip when the resistance of the latter is greater than normal.

16. In apparatus of the described class, the combination of a platform, means for feeding a paper strip longitudinally along said platform, a forming roller supported above said platform on an axis transverse thereto and in a position to bear against the central portion of the strip of paper on its upper side, a roller supporting the under surface of the strip of paper underneath the forming roller and projecting through an opening in said platform, and stationary forming guides for the side portions of the strip of paper adapted to engage said side portions adjacent to and beyond said forming roller.

17. In apparatus of the described class, the combination with means for feeding, gluing, forming and compressing a continuous paper strip and depositing filling material thereon preparatory to the forming operation, of a reciprocating strip severing knife and holding devices located in advance thereof, and adapted to engage and detain the end of the strip whenever the knife moves across the path thereof, said holding devices comprising a set of rollers, a ratchet member connected therewith, and a yielding detent carried by the knife, and adapted to engage said ratchet preparatory to the movement of the knife across the strip.

18. In apparatus of the described class, the combination with feeding, gluing, filling, forming and compressing devices for forming a continuous pad strip, of a severing knife, a frame pivotally supporting one end of the knife at one side of the strip, a shear bar below the strip, a vertically reciprocating member at the other side of the strip, a toothed segment carried by the knife, a rack on the reciprocating member meshing with said segment, and intermittingly acting devices for depressing said member.

19. In apparatus of the described class, the combination with feeding, gluing, filling, forming and compressing devices for forming a continuous pad strip, of a severing knife, a frame pivotally supporting one end of the knife at one side of the strip, a shear bar below the strip, a vertically reciprocating member at the other side of the strip, a toothed segment carried by the knife, a rack on the reciprocating member meshing with said segment and a spring connecting said knife with the frame and adapted to restore the knife and reciprocating member to raised position after each downward stroke.

20. In apparatus of the described class, the combination with feeding, gluing, filling, forming and compressing devices for forming a continuous pad strip, of a severing knife, a frame pivotally supporting one end of the knife at one side of the strip, a shear bar below the strip, a vertically reciprocating member at the other side of the strip, a toothed segment carried by the knife, a rack on the reciprocating member meshing with said segment, together with means for varying the intervals between successive actuating strokes of such devices.

21. In apparatus of the described class, the combination with feeding, gluing, filling, forming, and compressing devices for forming a continuous pad strip, of a severing knife, a frame pivotally supporting one end of the knife at one side of the strip, a shear bar below the strip, a vertically reciprocating member at the other side of the strip, a toothed segment carried by the knife, a rack on the reciprocating member meshing with said segment, and a spring connecting said knife with the frame and adapted to restore the knife and reciprocating member to raised position after each downward stroke, together with means for varying the interval between successive actuating strokes of such devices, said intermittingly acting devices, comprising crank and connecting rod mechanism, a coupling for engaging the reciprocating mechanism, and step by step mechanism controlling the engagement of the coupling.

22. In apparatus of the described class, the combination with feeding, gluing, filling, forming, and compressing devices for forming a continuous pad strip, of a severing knife, a frame pivotally supporting one end of the knife at one side of the strip, a shear bar below the strip, a vertically reciprocating member at the other side of the strip, a toothed segment carried by the knife, a rack on the reciprocating member meshing with said segment, and a spring connecting said knife with the frame, and adapted to restore the knife and reciprocating member to raised position after each downward stroke together with means for varying the intervals between successive actuating strokes of such devices, said intermittingly acting devices comprising crank and connecting rod mechanism, a coupling for engaging the reciprocating mechanism, and step by step mechanism controlling engagement of the coupling, together with means for increasing or diminishing the length of the step by step movements to shorten or lengthen the intervals between the coupling operations.

23. In apparatus of the described class, the combination with feeding, gluing, filling, forming, and compressing devices for forming a continuous pad strip, of a severing knife, a frame pivotally supporting one end of the knife at one side of the strip, a shear bar below the strip, a vertically reciprocating member at the other side of the strip, a toothed segment carried by the knife, a rack on the reciprocating member meshing with said segment and a spring connecting said knife with the frame and adapted to support the knife and reciprocating member in raised position after each stroke, together with means for varying the intervals between successive actuating strokes of such devices, said intermittingly acting devices comprising crank and connecting rod mechanism, a coupling for engaging the reciprocating mechanism, and step by step mechanism controlling the engagement of the coupling, together with means for increasing or diminishing the length of the step by step movements to shorten or lengthen the intervals between the coupling operations, and variable speed driving connections for the crank mechanism, adapted to additionally vary the intervals between knife strokes.

24. In a machine of the described class, the combination with pad forming devices, of a feeder for pad filling material, comprising a pair of toothed cylinders revolving in opposite directions, detaining concaves having teeth interacting with the teeth of each cylinder, and means for delivering material from one cylinder to the next.

25. In a machine of the described class, the combination with pad forming devices, of a feeder for pad filling material, comprising a pair of toothed cylinders revolving in opposite directions, detaining concaves having teeth interacting with the teeth of each cylinder, and means for delivering material from one cylinder to the next, the first of said cylinders being revolved upwardly across the line of feed at the receiving point.

26. In a machine of the described class, the combination with pad forming devices, of a feeder for pad filling material, comprising a pair of toothed cylinders revolving in opposite directions, detaining concaves having teeth interacting with the teeth of each cylinder, and means for delivering material from one cylinder to the next, the first of said cylinders being revolved upwardly across the line of feed at the receiving point and a set of clearing bars interposed between the teeth of the second cylinder and extending outwardly therefrom at their respective ends.

27. In a machine of the described class, the combination with pad forming devices, of a feeder for pad filling material, comprising a pair of toothed cylinders revolving in opposite directions, detaining concaves having teeth interacting with the teeth of each cylinder, and means for delivering material from one cylinder to the next, the first of said cylinders being revolved upwardly across the line of feed at the receiving point and a set of clearing bars interposed between the teeth of the second cylinder and extending outwardly therefrom at their respective ends and at a tangent to the cylinder surface on the under side.

28. In apparatus of the described class, the combination of a platform having a relative angular pitch from an intermediate point, means for feeding a paper strip longitudinally across the angle in said platform, a forming roller arranged to bear yieldingly against the central portion of the strip on the upper side and adjacent to the angle in said platform, forming guides for the side portions of the strip, a roller supporting the under surface of the strip underneath the forming roller, a roller over which said strip is fed to the forming rollers, and a set of rollers between which said
5 strip is fed beyond the forming rollers, said last mentioned set of rollers constituting the feeding rollers for said strip.

In testimony whereof I affix my signature in the presence of two witnesses.

EDWARD WILLIAM GOODRICK.

Witnesses:
W. F. GRUENEWALD,
A. W. OTTO.